United States Patent [19]

Sawyer

[11] Patent Number: 5,082,619
[45] Date of Patent: * Jan. 21, 1992

[54] PASSIVE HEAT REMOVAL FROM NUCLEAR REACTOR CONTAINMENT

[75] Inventor: Craig D. Sawyer, Los Gatos, Calif.

[73] Assignee: General Electric Company, San Jose, Calif.

[*] Notice: The portion of the term of this patent subsequent to Oct. 22, 2008 has been disclaimed.

[21] Appl. No.: 432,246

[22] Filed: Nov. 6, 1989

[51] Int. Cl.$^5$ ............................................. G21C 15/18
[52] U.S. Cl. ..................................... 376/283; 376/299
[58] Field of Search ............... 376/282, 283, 293, 298, 376/299

[56] References Cited

U.S. PATENT DOCUMENTS

| 3,718,539 | 2/1973 | West et al. | 376/283 |
|---|---|---|---|
| 4,050,983 | 9/1977 | Kleimola | 376/283 |
| 4,927,596 | 5/1990 | Minnick | 376/283 |

FOREIGN PATENT DOCUMENTS

| 212892 | 9/1988 | Japan | 376/283 |
|---|---|---|---|
| 1507688 | 4/1978 | United Kingdom | |

Primary Examiner—Daniel D. Wasil
Attorney, Agent, or Firm—Robert R. Schroeder

[57] ABSTRACT

A nuclear system of the type which includes a containment wherein a nuclear reactor pressure vessel is located has a suppression pool to which steam can be vented so that it will condense and reduce the pressure in the pressure vessel upon the happening of an accident such as loss of reactor coolant or a steam pipe failure. Steam also can be vented directly to the containment space to further reduce pressure in the reactor. When reactor pressure is lowered to a certain pressure value, a gravity supply of water from an elevated pool of water will have a sufficient head to flow against the pressure in the reactor and into the reactor to submerge the fuel rods in the reactor. One or more isolation condensers are submerged in a large supply of water this supply being elevated some distance above the pressure vessel. At least one isolation condenser has inlet thereto communicated to an open entry conduit disposed in the containment. Steam in the containment space can enter the isolation condenser to be cooled at any time an accident occurs and steam is vented into the containment. The condensing of steam in the condenser boils water in the large supply but since the large water supply is open to atmosphere the boil-off is vented. Condensate resulting from cooling occurring in the isolation condenser is returned to the suppression pool and noncondensable gases present in the steam being condensed are separated from the condensate and vented to the suppression pool.

8 Claims, 2 Drawing Sheets

PASSIVE HEAT REMOVAL FROM NUCLEAR REACTOR CONTAINMENT

BACKGROUND OF THE INVENTION

The present invention relates to nuclear reactors and the containment therefor, the invention more particularly being directed to passive heat removal from the containment in the event of one or more types of system malfunctions.

Commonly assigned application Ser. No. 07/325,729 filed Mar. 20, 1989 discloses a nuclear reactor system which on occurrence of an accident, e.g., loss of coolant in the reactor vessel, break in main steam pipe etc operates to dissipate initial heat generated incident the occurrence and also to dissipate the decay heat, i.e., the heat produced by fuel rod decay reactions which persist for a period of time of days or even weeks duration.

In the prior disclosed system, initial heat can be dissipated by venting steam generated in the pressure vessel to a suppression pool in a closed space wherein the steam condenses and heat is transferred to water in the pool. After the pressure in the reactor vessel reduces to a certain magnitude, water in an elevated pool will flow by force of gravity into the reactor vessel to replace any loss of coolant therein as may have taken place, the elevation height of the pool being such as to provide a flow head sufficient to overcome the reduced pressure value in the reactor vessel. In the prior system, one or more isolation condensers are submerged in a large supply of water disposed elevated with respect to the pressure vessel, the water in turn being open to atmosphere so that any boiling thereof caused by a heat transfer from a heated medium passing through the condenser can be passed to atmosphere. This heat transfer results from venting the pressure vessel to the isolation condenser through an isolation line connecting the pressure vessel with the inlet side of the condenser, the condenser in this case serving to dissipate initial heat. Condensate from the isolation condenser is returned to the pressure vessel by a return line connecting the condenser outlet with the pressure vessel.

A depressurization line in the system also can be opened to vent steam to the drywell surrounding the pressure vessel and in time the steam pressure in the drywell will, due to vessel cooling, be higher than that in the vessel. As a result, steam from the drywell will pass through the depressurization line, through the pressure vessel, the isolation line and into the isolation condenser where it will be condensed. In this manner and over a period of time, decay heat is dissipated.

The arrangement and operation of the prior disclosed system involves the need during an accident to open valves, either automatically or manually, in one or both of the isolation line and condensate return line, and in a condenser vent line as a condition for cooling to be carried out in the isolation condenser. Since automated controls and/or human intervention are subject to failure, isolation condenser operation is only passive to the extent that these components operate. Also, it is noted that it is only sometime after accident occurrence that heat dissipation from the containment space through the isolation condensers is initiated.

OBJECTS AND SUMMARY OF THE INVENTION

Accordingly, it is an object of the invention to provide improved heat removal capability in a nuclear reactor system for removing heat from the reactor and its containment space when a system malfunction or accident occurs.

It is a further object of the invention to provide a fully passive means for effecting heat removal from the containment space so automated and/or human agency involvement which is always susceptible to failure is eliminated.

It is a still further object of the invention to provide heat removal means which is disposed in the nuclear reactor containment space and is always in heat exchange communication with that containment space so that heated fluids present in the containment space can always access a cooling means and be cooled before such fluids could effect containment space structure integrity.

Briefly stated, the present invention provides a nuclear system of the type which includes a containment wherein a nuclear reactor pressure vessel is located, the system including a suppression pool to which steam can be vented so that it will condense and reduce the pressure in the pressure vessel upon the happening of an accident such as loss of reactor coolant or a steam pipe failure. Steam also can be vented directly to the containment space to further reduce pressure in the reactor.

When reactor pressure is lowered to a predetermined pressure value, a gravity supply of water from an elevated pool of water elevated to a height to have a sufficient head to flow against the predetermined pressure in the reactor, will flow into the reactor to submerge the fuel rods therein. One or more isolation condensers are submerged in a large supply of water, this supply being elevated some distance above the pressure vessel. At least one isolation condenser has inlet thereto communicated to an open entry conduit disposed in the containment. Steam in the containment space can enter the isolation condenser to be cooled at any time an accident occurs and steam is vented into the containment. The condensing of steam in the condenser boils water in the large water supply but since this water supply is open to atmosphere, such boil-off is vented to atmosphere without any hazard of environmental contamination. Condensate resulting from the cooling occurring in the isolation condenser is returned to the suppression pool, and non-condensable gasses which were present in the steam are separated from the condensate and vented to the suppression pool.

In accordance with these and other objects of the invention, there is provided a nuclear system including a containment having a nuclear reactor therein, the system comprising: a heat exchanger; a pool of water surrounding the heat exchanger; means for venting the pool of water to the environment outside the containment; an open entry conduit within said containment and communicating with said heat exchanger, heated fluid present in the containment flowing into said heat exchanger through said conduit and being cooled in said heat exchanger; and means for returning cooled fluid from said heat exchanger to a collection space in said containment. The use of an open entry conduit to admit heated fluid to the isolation condenser and means to return cooled fluid to a collection space assures that in event of an accident, immediate operating and fully passive means are available to start dissipating heat in the containment space. The collection space conveniently can be the suppression pool and the means for returning cooled fluid to that space can be a non-blockable conduit.

A condensate/non-condensable gas collector means can be disposed in the return conduit with non-condensable gasses passing from the collection means to a vent pipe which outlets in the suppression pool.

According to a further feature of the invention, there is provided a nuclear system of the type including a containment having a nuclear reactor pressure vessel therein and comprising a plurality of heat exchangers; a pool of water surrounding each of said heat exchangers; means for venting said pool of water to the environment; an open entry conduit within said containment and communicating with at least one of said heat exchangers, heated fluid present in the containment flowing into said one heat exchanger; means for returning cooled fluid from said one heat exchanger to a collection space in the containment; an isolation line connecting said pressure vessel with at least one other of said heat exchangers whereby heated fluid present in the pressure vessel can be conveyed to said other heat exchanger for cooling therein; and an isolation return line connecting said other heat exchanger with said pressure vessel for returning cooled fluid from said other heat exchanger to said pressure vessel.

The above, and other objects, features and advantages of the invention will become apparent from the following description read in conjunction with the accompanying drawings, in which like reference numerals indicate like parts in the description.

BRIEF DESCRIPTION OF THE DRAWINGS

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
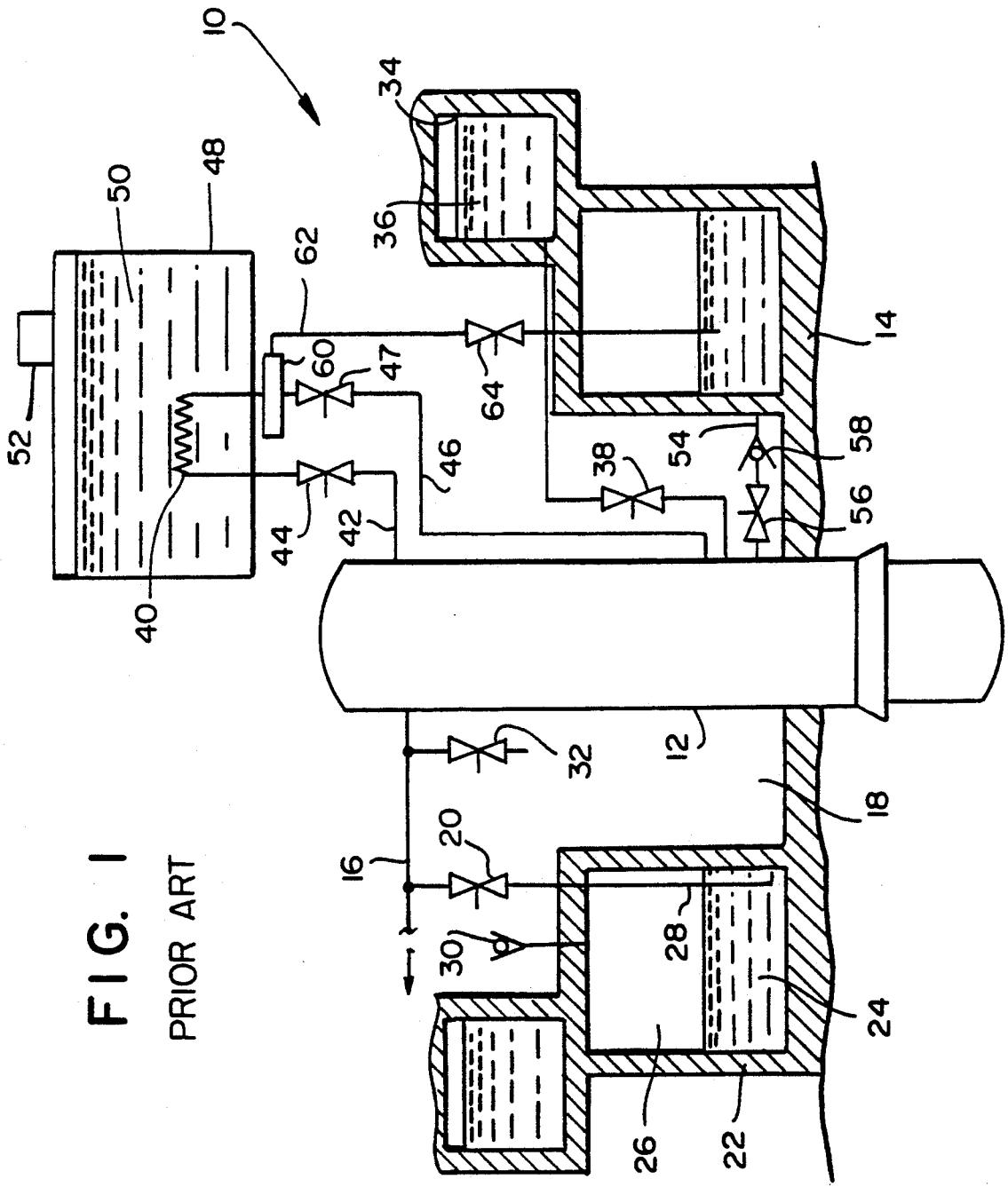
FIG. 1 is a simplified schematic depiction of a nuclear reactor system of the construction disclosed in application Ser. No. 07/325,729.

FIG. 1 depicts the nuclear reactor system of pending application Ser. No. 07/325,729, that system 10 including a pressure vessel 12 disposed in a containment space defined by containment building 14, only a portion of the building being shown but it being understood that same is a reinforced structure having strength to withstand any pressure as may exist therein in consequence of a malfunction or accident. Steam for system service use is delivered through steam line 16 to a point of use, the line 16 being provided with a depressurization valve 32 and a safety relief valve 20. The pressure vessel is situated in the drywell 18 of the containment space and that in turn is surrounded by an annular structure containing a suppression pool 22 of water 24 to which steam in the event of pressure vessel rupture or steam line break at a downstream line location, can be diverted through outlet tube 28 into the suppression pool so the steam will condense and pressure thereby reduced in the pressure vessel. Also high pressure steam entering the containment space from a large steam line break or pressure vessel rupture can enter suppression pool 22 through vent pipes (not shown) communicating between the drywell and horizontal vents leading into the suppression chamber below the top of the water and as described in commonly-owned application Ser. No. 07/350,189 filed May 11, 1989, now U.S. Pat. No. 4,950,448 and entitled PASSIVE HEAT REMOVAL FROM CONTAINMENT. The suppression pool is sized to have a substantial air space 26 above water 24 to provide a compressible medium headspace in the pool.

A gravity driven cooling system pool 34 including sufficient supply of water 36 to flood the pressure vessel to a depth substantially above the fuel rods in event of vessel rupture is located elevated some distance above the suppression pool. The line connecting pool 34 to the pressure vessel is fitted with a normally closed control valve 38. An equalizing line 54 connects the suppression pool to the pressure vessel, the line having a normally closed stop valve 56 and a check valve 58, the check valve preventing back flow to the suppression pool from the pressure vessel or the gravity pool 34 whenever valve 56 is open. The FIG. 1 system also includes an isolation condenser 40 which is submerged in an isolation pool 48 comprised of a large body of water 50, the isolation pool being open to atmosphere by means of vent stack 52. The isolation condenser inlet is connected to the pressure vessel by means of isolation line 42 and intervening isolation valve 44. An isolation return line 46 connects the condenser outlet with the pressure vessel so that steam condensate can be returned from the condenser to the vessel, that line having a valve 47 and a condensate/non-condensable gas collector chamber 60 therein, the non-condensables being vented from chamber 60 to the suppression pool through vent line 62 which is fitted with a normally closed vent valve 64. On occurrence of a malfunction, either as a loss of coolant in the reactor or a break in the steam line, valve 20 is opened to direct steam from the reactor to suppression pool 22 thereby to condense the steam and dissipate a significant amount of the initial heat. Diverting the steam in this manner reduces pressure within the reactor and that pressure may be further lowered by opening depressurization valve 32 so that the head of pressure in gravity pool 34 is sufficient to overcome the reduced pressure inside the pressure vessel and cooling water will flow from the pool into the reactor to a level above that required to cover the reactor core, the valve 38 having been opened at about the time valve 32 was opened.

Dissipation of heat also takes place in the isolation condenser 40. Normally, isolation valve 44 is open and valves 47 and 64 are closed. When an accident occurs, valves 47 and 64 will be opened so that steam from the pressure vessel will flow into the isolation condenser and be cooled to condensate, heat transfer being to the body of water 50 and any boiling of that body being vented to atmosphere by vent stack 52. Long term or decay heat dissipation will occur in condenser 40. Condensate from the condenser 40 is returned to the pressure vessel via line 46, and non-condensables to the suppression pool by way of vent line 62. After the pressure reduces in the pressure vessel to a level below that present in the containment space and because the depressurization valve is open, steam present in the containment space can enter the pressure vessel through valve 32 and pass on to the condenser 40 for condensing of same. The reactor system can employ plural isolation condensers and most usually will use four such condensers in association with a reactor vessel.

The system arrangement of FIG. 1 it will be seen establishes heat dissipation communication with the isolation condenser only by way of the reactor vessel including communication of the containment space as such with condenser 40. Further, it is only after the reactor pressure is reduced below that present in the containment space that this communication takes place. The present invention improves the FIG. 1 system to provide for immediate availability of isolation condenser cooling of steam present in the containment space upon happening of an accident and by means of a fully passive system arrangement that operates without reliance on any automatically or human controlled device whereby there is assured immediate heat dissipation response in the containment space at the instant an accident occurs. The invention contemplates that at least one and probably two of the plural isolation condensers included in a FIG. 1 system would be constructed in the manner shown in FIG. 2 to be described next.

Figure 2:
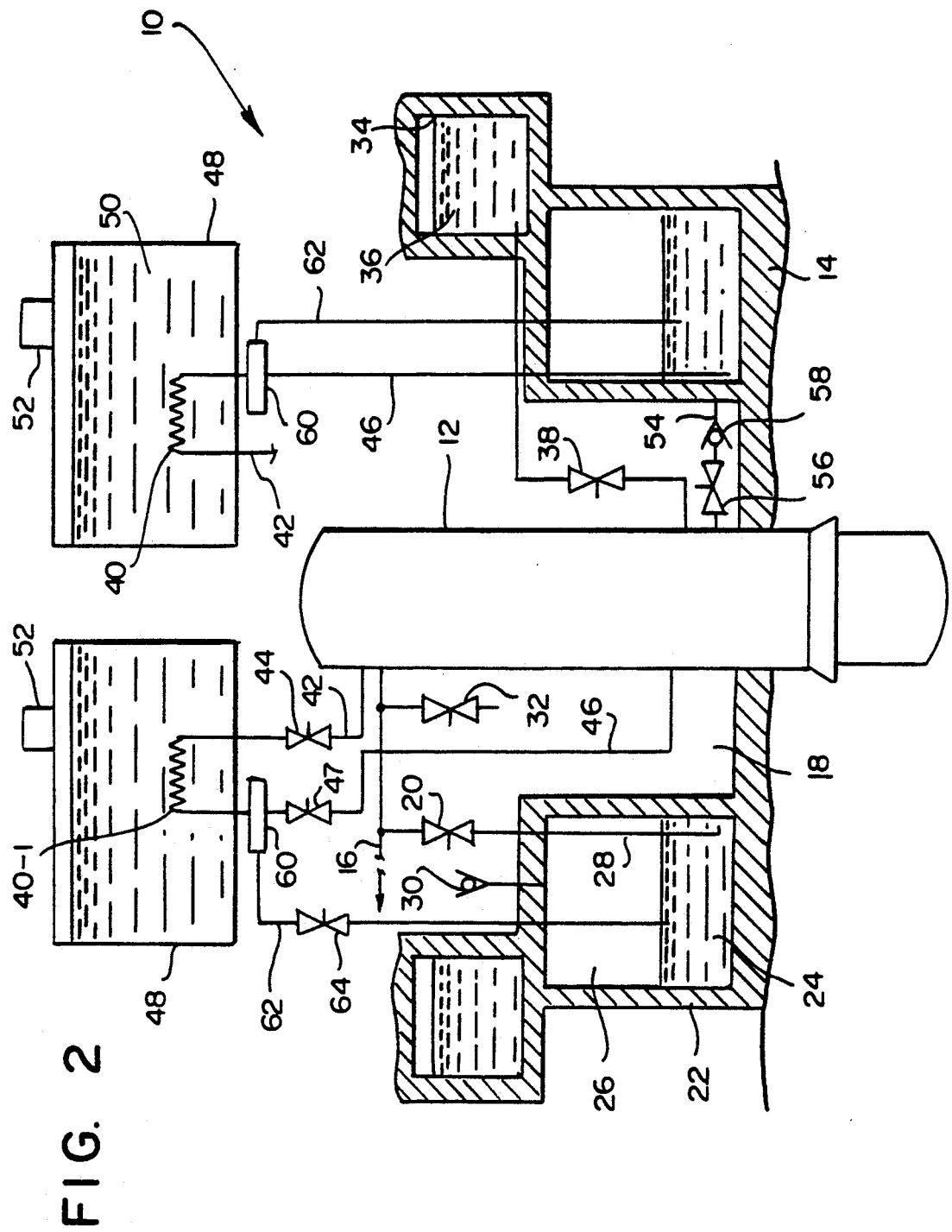
FIG. 2 is a schematic depiction showing a nuclear reactor system having containment space passive heat removal capability as provided by the present invention.

Referring to FIG. 2, the system 10 embodies elements common to the FIG. 1 system, and so the same reference numerals are employed in each Figure but it is to be noted the FIG. 2 system does not employ all the valves used in the FIG. 1 system. According to the invention, isolation line 42 is not connected to the pressure vessel but rather is an open entry conduit having its open end situated in elevated location within the reactor containment space to maximize convective flow entry of steam to the conduit and on into the isolation condenser 40, the other end of conduit 42 communicating with the condenser inlet. The isolation return line 46 which receives condensate outflow from the isolation condenser is connected at one end to the condenser outlet and at its other end locates in a containment collection space, i.e., in the suppression pool 22. Both isolation line 42 and return conduit 46 are of unblockable character, i.e., neither has a component such as a valve or other device located along its course that could block steam flow into the condenser or condensate flow out therefrom. The other or lower end of conduit 46 is submerged a distance below the normal water level in pool 22.

Chamber 60 which is in the conduit line 46 does not contain any part which could block flow into the conduit 46. It simply serves to collect condensate at the condenser outlet end and pass it directly into conduit 46. Chamber 60 also collects non-condensable gasses such as air and they pass into vent pipe 62 and from it into the suppression pool, the lower end of pipe 62 also being submerged below the normal water level in pool 22 but not to the extent to which the lower end of return conduit 42 is.

Operation of the suppression pool 22, gravity driven cooling system pool 34, equalizing line 54, valves 20 and 32 and vacuum breaker 30 are the same and for the same purpose as is shown in the FIG. 1 system. The principal advantage of providing at least some isolation condensers of the FIG. 2 character in a nuclear reactor system is the immediate capability of the system to deal with a large measure of heat invading the reactor containment space, this being possible without dependence on any other system heat dissipating means or devices, the system having instantaneous response to the heat presence because it is fully passive not needing automated or human initiated response.

A further embodiment of the invention provides that a nuclear reactor system will employ plural isolation condensers, at least one of these condensers being of the FIG. 2 arrangement and at least one other being of the FIG. 1 arrangement. Thus isolation condenser 40 will be employed for direct drywell passive cooling upon happening of a loss-of-coolant accident, whereas, isolation condenser 40-1 can be used for cooling of steam from the pressure vessel 12 flowing thereto via isolation line 42 thereby facilitating depressurization of the vessel. Such use of the differently arranged isolation condensers maximizes the flexibility of the system to deal with dissipation of both initial and decay heat loads.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A nuclear reactor system of a type including a containment having a nuclear reactor therein, the nuclear reactor including a pressure vessel, the containment including a drywell, the pressure vessel being situated in the drywell, the system comprising:
    a heat exchanger in the containment drywell;
    a pool of water surrounding said heat exchanger;
    means for venting said pool of water to the environment outside said containment;
    an open entry non-blockable conduit within said containment drywell and communicating with said heat exchanger, heated fluid present in the containment drywell flowing into said heat exchanger through said conduit and being cooled in said heat exchanger; and
    means for returning cooled fluid from said heat exchanger to a collection space in said containment.

2. A nuclear system in accordance with claim 1, further comprising a suppression pool in said containment, said suppression pool including a supply of water therein, the collection space to which cooled fluid is returned comprising said suppression pool.

3. A nuclear system in accordance with claim 2, in which the means for returning cooled fluid from said heat exchanger to the suppression pool comprises non-blockable conduit means connected at one end with a heat exchanger outlet, an opposite conduit end being situate in said collection space.

4. A nuclear system in accordance with claim 3, in which said cooled fluid return conduit opposite end is disposed for outlet therefrom at a location submerged a distance below a normal water level in said suppression pool.

5. A nuclear system of a type including a containment having a nuclear reactor therein, comprising:
    a heat exchanger;
    a pool of water surrounding said heat exchanger;
    means for venting said pool of water to the environment outside said containment;
    an open entry conduit within said containment and communicating with said heat exchanger, heated fluid present in the containment flowing into said heat exchanger through said conduit and being cooled in said heat exchanger;
    a suppression pool in said containment, said suppression pool including a supply of water therein;
    a non-blockable conduit connected at an end thereof with a heat exchanger outlet for returning cooled fluid from said heat exchanger to the suppression pool, an opposite cooled fluid return conduit end being disposed at a location submerged a distance below a normal water level in the suppression pool, said system further comprising a condensate/non-condensable gas collector means disposed in said cooled fluid return conduit, condensate passing from said collector means to said cooled fluid return conduit opposite end, the non-condensable gasses passing from said collector means to a vent pipe means connected at one end with said collector means, the pipe means having another end outletting in the suppression pool.

6. A nuclear system in accordance with claim 5, in which said pipe means other end outlet locates submerged a distance below a normal water level in said suppression pool.

7. A nuclear system in accordance with claim 6, in which said pipe means other end outlet submergence level below a normal suppression pool water level is less than that of said cooled fluid return conduit opposite end.

8. A nuclear system of the type including a containment having a nuclear reactor pressure vessel therein, comprising:
 a plurality of heat exchangers;
 a pool of water surrounding each of said heat exchangers;
 means for venting said pool of water to the environment;
 an open entry conduit within said containment and communicating with at least one of said heat exchangers, heated fluid present in the containment flowing into said heat exchanger through said conduit and being cooled in said heat exchanger;
 means for returning cooled fluid from said one heat exchanger to a collection space in said containment;
 an isolation line connecting said pressure vessel to at least one other of said heat exchangers whereby heated fluid present in the pressure vessel can be conveyed to said other heat exchanger for cooling therein; and
 an isolation return line connecting said other heat exchanger with said pressure vessel for returning cooled fluid from said other heat exchanger to said pressure vessel.

* * * * *